June 30, 1936.   H. RICHARDS   2,046,210
PERCUSSIVE TOOL
Filed Feb. 9, 1935   3 Sheets-Sheet 3

INVENTOR,
H. RICHARDS.
By Bair & Kilsyth
ATT'YS.

Patented June 30, 1936

2,046,210

UNITED STATES PATENT OFFICE 2,046,210

PERCUSSIVE TOOL

Harry Richards, London, England, assignor to S. Wolf & Company Limited, London, England, a British company Application February 9, 1935, Serial No. 5,803
In Great Britain March 5, 1934

2 Claims. (Cl. 255—41)

This invention relates to percussive tools such as chippers and hammers, and preferably to the kind in which blows are imparted to the tool on the release of a spring which is compressed by co-acting cams one or more times in the revolution of a driven shaft.

Portable percussive tools as now constructed are both bulky and expensive and in consequence are not to be found in such general use as their utility would otherwise ensure. On the other hand such a tool as a portable electric, pneumatic or other drill is to be found in almost every engineering workshop owing to the fact that, comparatively, it is both cheap and light in weight.

One of the objects therefore of the present invention is to enable such a tool to be cheaply and easily convertible, as occasion requires, into a percussive tool of the same or similar portability and in such a manner that it is as easily reconvertible when again required to function as a drill.

Broadly the present invention consists of a device in the form of a detachable unit which may be substituted for a portion of a conventional rotary tool such as the gear box of a portable electric or other drill so as to convert such rotary tool into a percussive tool.

A device according to one embodiment of this invention comprises a casing which is adapted to be substituted for the gear-box or chuck-carrying portion of a portable electric drill and such casing contains a spindle corresponding to the spindle of the electric drill which carries the chuck or other tool holder. This spindle which is both reciprocable and rotatable is provided at its upper end with a toothed wheel which meshes with a pinion of greater width to allow for the reciprocating movement of the aforesaid spindle. On the lower end of the spindle is formed or fitted a face cam which co-acts with an equivalent fixed cam to impart to the spindle the required reciprocable movement.

In order that the invention may be clearly understood and carried into effect such an embodiment will now be described by aid of the accompanying drawings in which:—

Figure 1:
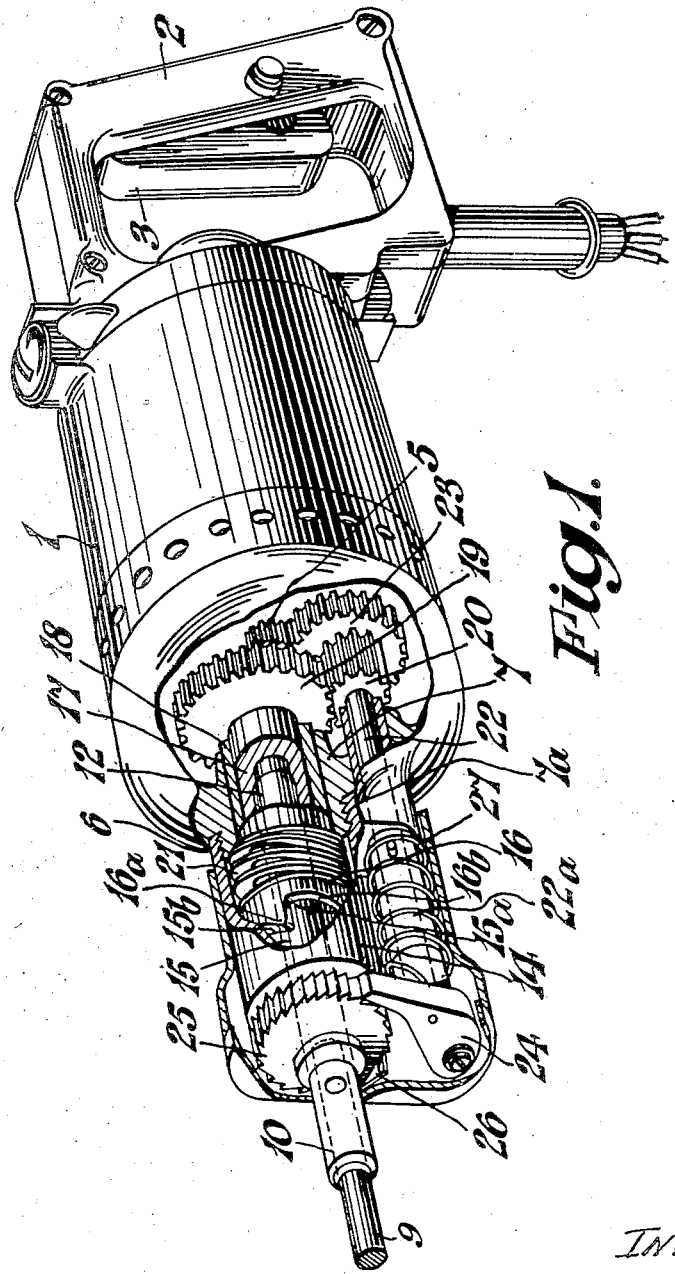
Fig. 1 is a perspective view showing in part section a detachable unit according to this invention fitted to the end of a conventional electric drill in replacement of the usual gear-box or chuck carrying portion.
Figure 2:
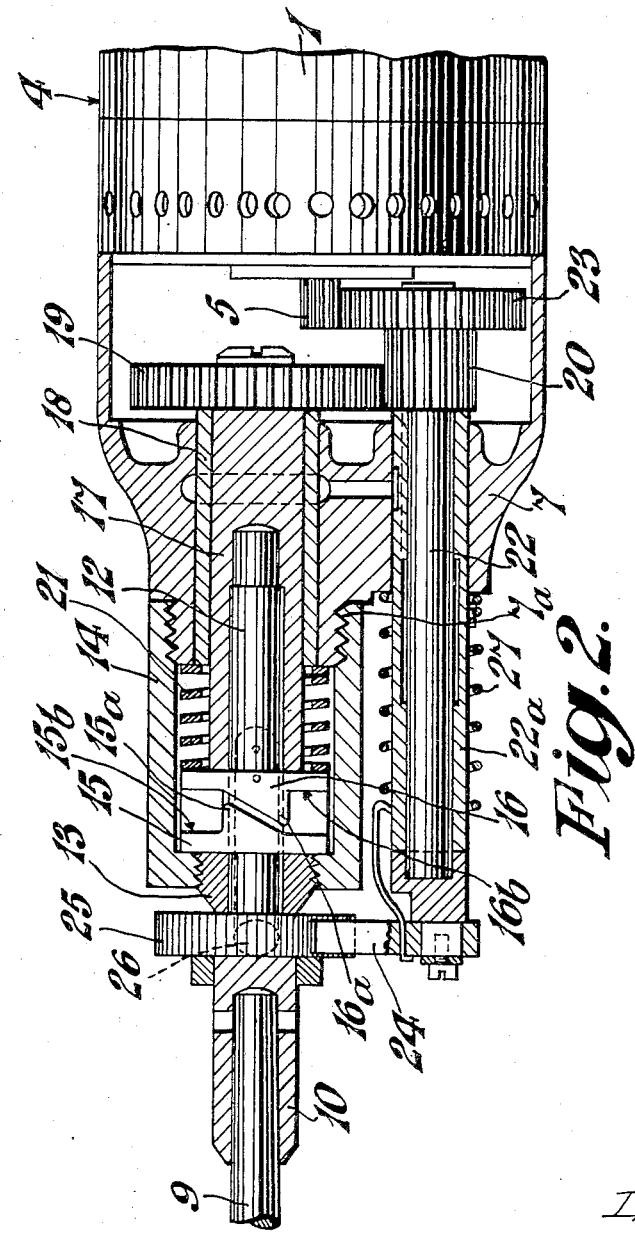
Fig. 2 is a longitudinal section through the unit to a slightly larger scale than Fig. 1.
Figure 4:
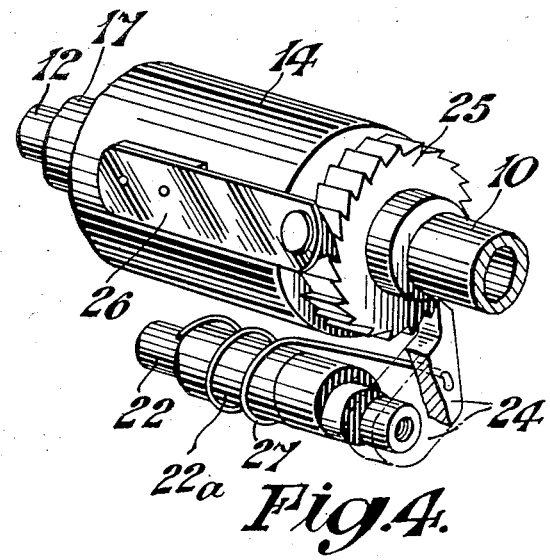
Fig. 4 is a perspective view of a portion of the unit hereinafter to be described showing the same detached from the main casing.
Figure 3:
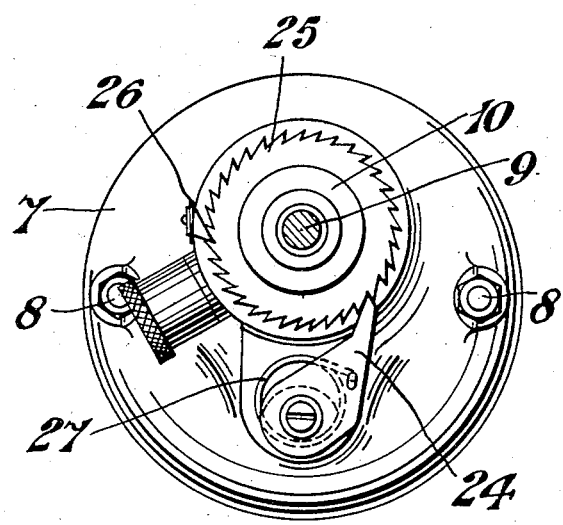
Fig. 3 is an end elevation of Fig. 2.

In the embodiment illustrated the unit according to the present invention is shown fitted to a standard portable electric drill, 1, having a handle 2 at one end embodying the usual motor control switch 3, the motor (not shown) being housed in the main casing 4. The armature shaft also not shown is fitted with a toothed pinion 5, which pinion forms the driving connection to the unit.

The forward end of the casing 4 is adapted detachably to receive the unit which is noted generally by the numeral 6.

The unit in the form illustrated comprises a casing 7 which is secured to the main casing 4 of the drill by bolts 8. A portion of the casing 7 is threaded as at 7a to receive a hollow metal cap 14 which is correspondingly threaded at one end for the purpose. The outer end of the cap 14 is threaded internally to receive a boss 13 forming part of a face cam 15, having high and low portions 15a and 15b.

To prevent the cam from becoming loose during use the coacting threads in the cap and on the boss are left handed. This construction permits the cam to be removed at will for renewal or other purpose.

Co-acting with the fixed cam is a further face cam 16 which is also provided with high and low portions 16a and 16b corresponding to the portions 15a and 15b of the cam 15. This cam 16 is carried by, and secured to one end of a sleeve 17 with which it is rotated. The cams 15 and 16 are normally kept in contact with each other by means of a spring 21, which spring is of such a diameter that it can be slipped over the sleeve 17, one end of it being supported by the bearing 18, the other end abutting against the rear of the cam 16.

Rotary movement is imparted to the sleeve 17 and cam 16 from the motor, through a toothed wheel 19 which is mounted upon the upper end of the sleeve, said wheel meshing in turn with a double width pinion 20. The pinion 20 is mounted upon the upper end of a shaft 22 carried in a bearing 22a formed in the casing 7. Also mounted on this shaft is a toothed wheel 23 which engages with and consequently is driven by the main driving pinion 5 aforementioned.

This rotary movement of the sleeve 17 and cam 16 is transformed into a reciprocating movement in consequence of the rotation of the cam 16, the high portions 16a thereof co-acting with the high portions 15a of cam 15 whereupon the sleeve 17 and cam 16 are thrust back against the spring 21, the continued rotary motion of the cam 16 bringing the cams into their normal position again. When this position is reached the compressed spring will cause the cam 16 and with it the sleeve 17 to drop sharply thereby imparting a blow to a positioned tool as will now be described.

The tool in use which may be a hammer, chisel or the like, a portion of which is shown at 9, is secured in the holder 10 in any suitable manner such as by forming the same with a taper shank. The holder 10 is provided with a shank 12 which passes into the interior of the casing 7 through the boss 13 and cams 15 and 16 and is mainly supported in a recess bored for the purpose in the sleeve 17, the upper end of the shank bearing against the inner end of the recess when the sleeve 17 is in the lowered position.

In operation and when the motor is switched on, the pinion 5 transmits motion to the shaft 22 through the toothed wheel 23. This in turn causes rotation of the pinion 20 and through it the wheel 19. This wheel in turn drives the sleeve 17 and associated cam 16. By this means a series of rapid blows is imparted to the upper end of the shank 12 and through it to a positioned tool 9.

When a hole is being cut or drilled in brickwork it is desirable to impart a turning or intermittent rotary movement to dislodge accumulated dust or chippings. To accomplish this intermittent rotary movement the shaft 22 is provided at its outer end with a spring controlled pawl 24 the spring being shown at 27. The pawl is mounted eccentrically on the outer end of the shaft 22. When the shaft 22 is rotated said pawl imparts the required intermittent motion to the associated ratchet wheel 25 which is securely mounted on the tool holder 10. A stop 26 is provided to hold the ratchet wheel against movement in the reverse direction.

During a riveting, caulking or similar operation this intermittent rotation of the tool may not be desirable, and the rotary motion can be thrown out of action when required by releasing the spring 27 from the pawl, such pawl can then be turned out of engagement with the ratchet wheel.

What I claim is:—

1. A detachable unit for converting a motor driven rotary tool such as a portable drill having a main casing into a percussive tool comprising a cap to fit detachably the forward end of the casing of the rotary tool to be converted, a spindle reciprocably and rotatably mounted therein, a face cam on the outer end of said spindle, a further and stationary face cam disposed so as to coact with said former face cam to impart a reciprocating motion to the spindle, a spring tending to hold the spindle in its outermost position, said spindle having a recess extending partially up its length, said recess being coaxial with aligned apertures in the face cams to permit the recess to receive in slidable engagement the upper portion of the shank of a tool holder, a toothed wheel on the inner end of the spindle, means for rotating said spindle from the motor spindle of the tool to be converted comprising a double width pinion meshing with the toothed wheel on the inner end of the spindle and permitting the spindle to reciprocate without interruption of the drive, said double width pinion being driven from a pinion on the motor spindle of the tool to be converted through a toothed wheel arranged coaxially with the double width pinion, the arrangement being such that rotation of the said motor spindle imparts a combined rotary and reciprocating motion to the aforesaid spindle relatively to the shank of the tool holder, the upper end of which is subjected to a series of blows applied by the inner end of the recess in the spindle to the opposing end of the shank of the tool holder by the action of the spring in returning the reciprocating spindle after each inward movement imparted to the spindle by the coacting face cams.

2. A detachable unit for converting a motor driven rotary tool such as a portable drill having a main casing into a percussive tool comprising a cap to fit detachably the forward end of the casing of the rotary tool to be converted, a spindle reciprocably and rotatably mounted therein, a face cam on the outer end of said spindle, a further and stationary face cam disposed so as to coact with said former face cam to impart a reciprocating motion to the spindle, a spring tending to hold the spindle in its outermost position, said spindle having a recess extending partially up its length, said recess being coaxial with aligned apertures in the face cams to permit the recess to receive in slidable engagement the upper portion of the shank of a tool holder, a toothed wheel on the inner end of the spindle, means for rotating said spindle from the motor spindle of the tool to be converted comprising a double width pinion meshing with the toothed wheel on the inner end of the spindle and permitting the spindle to reciprocate without interruption of the drive, which double width pinion is driven from a pinion on the motor spindle of the tool to be converted through a toothed wheel arranged coaxially with the double width pinion, means deriving its motion from a spindle on which is mounted the double width pinion for imparting an intermittent rotation to the tool holder, the arrangement being such that rotation of the said motor spindle imparts a combined rotary and reciprocating motion to the aforesaid spindle relatively to the shank of the tool holder, the upper end of which is subjected to a series of blows applied as the tool holder is intermittently rotated by the inner end of the recess in the spindle to the opposing end of the shank of the tool holder by the action of the spring in returning the reciprocating spindle after each inward movement imparted by the coacting face cams.

HARRY RICHARDS.